(12) United States Patent
Elliott

(10) Patent No.: US 7,232,473 B2
(45) Date of Patent: Jun. 19, 2007

(54) COMPOSITE MATERIAL CONTAINING TUNGSTEN AND BRONZE

(75) Inventor: Kenneth H. Elliott, Baltimore (CA)

(73) Assignee: International Non-Toxic Composite, Ontario (CA)

( * ) Notice: Subject to any disclaimer, the term of this patent is extended or adjusted under 35 U.S.C. 154(b) by 0 days.

(21) Appl. No.: 10/270,526

(22) Filed: Oct. 16, 2002

(65) Prior Publication Data

US 2003/0161751 A1 Aug. 28, 2003

Related U.S. Application Data

(60) Provisional application No. 60/329,340, filed on Oct. 16, 2001.

(51) Int. Cl.
*C22C 27/04* (2006.01)
*C22C 9/02* (2006.01)
*B22F 3/12* (2006.01)

(52) U.S. Cl. .......................................... 75/245; 419/36

(58) Field of Classification Search ................ 102/517, 102/506; 419/36, 38; 75/247, 248, 245
See application file for complete search history.

(56) References Cited

U.S. PATENT DOCUMENTS

| | | | |
|---|---|---|---|
| 3,489,554 A * | 1/1970 | Waldo | ........................ 419/19 |
| 4,780,981 A | 11/1988 | Hayward et al. | |
| 4,850,278 A | 7/1989 | Dinkha | |
| 4,881,465 A | 11/1989 | Hooper et al. | |
| 4,939,996 A | 7/1990 | Dinkha | |
| 4,949,644 A | 8/1990 | Brown | |
| 4,949,645 A | 8/1990 | Hayward et al. | |
| 4,958,572 A | 9/1990 | Martel | |
| 4,981,512 A | 1/1991 | Kapoor | |
| 5,069,869 A | 12/1991 | Nicolas et al. | |
| 5,088,415 A | 2/1992 | Huffman et al. | |
| 5,159,007 A | 10/1992 | Saitoh et al. | |
| 5,189,252 A | 2/1993 | Huffman et al. | |
| 5,237,930 A | 8/1993 | Belanger et al. | |
| 5,263,417 A | 11/1993 | Godfrey-Phillips | |
| 5,264,022 A | 11/1993 | Haygarth et al. | |
| 5,279,787 A | 1/1994 | Oltrogge | |
| 5,333,550 A | 8/1994 | Rodney et al. | |
| 5,385,101 A | 1/1995 | Corzine et al. | |

(Continued)

FOREIGN PATENT DOCUMENTS

CA 2095232 5/1992

(Continued)

OTHER PUBLICATIONS

ASM Handbook, vol. 2, Properties and Selection: Nonferrous Alloys and Pure Metals, 1979, pp. 353-356.*

(Continued)

*Primary Examiner*—Roy King
*Assistant Examiner*—Christopher Kessler
(74) *Attorney, Agent, or Firm*—Sterne, Kessler, Goldstein & Fox P.L.L.C.

(57) ABSTRACT

High-density composite materials comprising tungsten and bronze are useful as lead replacements in the production of ammunition, weights and other high density articles. The composition of the composite, articles manufactured using the composite, and a process for making the composite are disclosed.

36 Claims, 7 Drawing Sheets

U.S. PATENT DOCUMENTS

| | | |
|---|---|---|
| 5,399,187 A | 3/1995 | Mravic et al. |
| 5,442,989 A | 8/1995 | Anderson |
| 5,500,183 A | 3/1996 | Noordegraf et al. |
| 5,513,689 A | 5/1996 | Montgomery et al. |
| 5,527,376 A | 6/1996 | Amick et al. |
| 5,535,495 A | 7/1996 | Gutowski |
| 5,535,678 A | 7/1996 | Brown |
| 5,540,749 A | 7/1996 | Li et al. |
| 5,549,048 A | 8/1996 | Godfrey-Phillips et al. |
| 5,616,642 A | 4/1997 | West et al. |
| 5,665,808 A | 9/1997 | Bilsbury et al. |
| 5,679,920 A | 10/1997 | Hallis et al. |
| 5,686,693 A | 11/1997 | Jakobsson |
| 5,713,981 A | 2/1998 | Amick et al. |
| 5,719,352 A | 2/1998 | Griffin |
| 5,728,349 A | 3/1998 | Persson |
| 5,760,331 A | 6/1998 | Lowden et al. |
| 5,763,819 A | 6/1998 | Huffman |
| 5,786,416 A | 7/1998 | Gardner |
| 5,789,698 A | 8/1998 | Beal |
| 5,814,759 A | 9/1998 | Mravic et al. |
| 5,831,188 A | 11/1998 | Amick et al. |
| 5,847,313 A | 12/1998 | Beal |
| 5,852,255 A | 12/1998 | Hallis et al. |
| 5,852,858 A | 12/1998 | Hallis et al. |
| 5,877,437 A | 3/1999 | Oltrogge |
| 5,894,644 A | 4/1999 | Mravic |
| 5,894,645 A | 4/1999 | Hallis et al. |
| 5,913,256 A | 6/1999 | Lowden et al. |
| 5,950,064 A | 9/1999 | Robinson |
| 5,963,776 A | 10/1999 | Lowden et al. |
| 6,016,754 A | 1/2000 | Enlow et al. |
| 6,045,601 A | 4/2000 | Tan |
| 6,048,379 A | 4/2000 | Bray et al. |
| 6,071,359 A | 6/2000 | Wisniewski et al. |
| 6,074,454 A | 6/2000 | Abrams et al. |
| 6,085,661 A | 7/2000 | Halverson |
| 6,090,178 A | 7/2000 | Benini |
| 6,112,669 A | 9/2000 | Mravic et al. |
| 6,149,705 A | 11/2000 | Lowden et al. |
| 6,174,494 B1 | 1/2001 | Lowden et al. |
| 6,182,574 B1 | 2/2001 | Giannoni |
| 6,202,561 B1 | 3/2001 | Head et al. |
| 6,216,598 B1 | 4/2001 | Phillips |
| 6,248,150 B1 | 6/2001 | Amick |
| 6,257,149 B1 | 7/2001 | Cesaroni |
| 6,258,316 B1 | 7/2001 | Buenemann et al. |
| 6,263,798 B1 | 7/2001 | Benini |
| 6,270,549 B1 | 8/2001 | Amick |
| 6,300,399 B1 | 10/2001 | Gallucci et al. |
| 6,317,946 B1 | 11/2001 | Beal |
| 6,447,715 B1 * | 9/2002 | Amick ................. 420/430 |
| 6,517,774 B1 * | 2/2003 | Bray et al. ................ 419/65 |
| 6,530,328 B2 | 3/2003 | Burczynski et al. |
| 6,536,352 B1 | 3/2003 | Nadkarni et al. |
| 6,551,375 B2 | 4/2003 | Siddle et al. |
| 2001/0050020 A1 | 12/2001 | Davis et al. |
| 2002/0005137 A1 | 1/2002 | Stone |
| 2002/0124759 A1 | 9/2002 | Amick |

FOREIGN PATENT DOCUMENTS

| | | |
|---|---|---|
| CA | 2202632 | 4/1996 |
| CA | 2248282 | 10/1997 |
| GB | 531389 | 1/1941 |
| JP | 03068729 | 3/1991 |
| JP | 11350008 | 12/1999 |
| JP | 2001050273 | 2/2001 |
| WO | WO 86/04135 | 7/1986 |
| WO | WO 88/09476 | 12/1988 |
| WO | WO 93/22470 | 11/1993 |
| WO | WO 00/37878 | 6/2000 |

OTHER PUBLICATIONS

Tandon, R. and Johnson, J., "Liquid-Phase Sintering," in ASM Handbook, vol. 7, pp. 565-573.*

"Tungsten Outflanks Lead", *The International Journal of Powder Metallurgy* (2001) 37(1):20.

*Manufacturing with Materials*, Lyndon Edwards and Mark Endean (eds.), (1990) Butterworth-Heinemann, Oxford, UK, pp. 207-221.

*Process Selection: From Design to Manufacture*, K.G. Swift and J.D. Booker, (1997) Arnold Publishers, London, UK.

Davis, J.R., ed., "Bronze," in: *ASM Materials Engineering Dictionary*, ASM International, Materials Park, OH, pp. 146 (1961).

"Bronze," in: *Merriam-Webster's Collegiate Dictionary*, Merrian-Webster, Incorporated, Springfield, MA, pp. 146 (1998).

Lyman, T., et al., eds., "Bronze," in: *Metals Handbook,* 8th Ed., American Society for Metals, Metals Park, OH, pp. 6 (1961).

Written Opinion for International Appl. No. PCT/CA02/01540, 5 pages, mailed Jun. 10, 2003.

International Preliminary Examination Report for International Appl. No. PCT/CA02/01540, 6 pages, mailed Jul. 28, 2003.

Examination Report for New Zealand Appl. No. 532693, 1 page, mailed May 27, 2004.

Communication pursuant to Article 96(2) EPC, Examination Report for European Appl. No. 02 801 255.7, 4 pages, mailed Jul. 21, 2004.

Office Action for Canadian Appl. NO. 2,462,977, 4 pages, mailed Aug. 23, 2004.

"Bronze," in: *Merriam-Webster's Collegiate Dictionary,* Merrian-Webster, Incorporated, Springfield, MA, pp. 146 (1996).

* cited by examiner

COMPOSITE MATERIAL CONTAINING TUNGSTEN AND BRONZE

CROSS-REFERENCE TO RELATED APPLICATIONS

This application claims the benefit of U.S. Provisional Application No. 60/329,340 filed Oct. 16, 2001.

FIELD OF THE INVENTION

This invention relates to composite materials, particularly to composite materials that can be used as lead replacements.

BACKGROUND OF THE INVENTION

Lead has been used in a variety of industrial applications for many thousands of years. In the last hundred years, the toxic effects of lead have become apparent. In an effort to reduce reliance on lead, there has recently been extensive research into materials that could be used to replace lead.

In this regard, much effort has been focussed on producing metal composites that mimic the properties of lead. Since the density of lead is the most obvious characteristic to mimic, most efforts have concentrated on finding composites that have the same or similar density as lead. However, other important properties of lead have been largely ignored and, as a result, no completely satisfactory lead replacement has yet been found.

In addition to being non-toxic and to having a similar density to lead, a successful composite should have reasonable softness coupled with structural rigidity. Ideally the composite is substantially homogeneous and relatively cheap to manufacture in large quantities.

U.S. Pat. No. 5,279,787 discloses high density projectiles formed by mixing a high density with a lower density metal. This patent does not disclose a composite made from tungsten and bronze.

U.S. Pat. No. 5,760,331 discloses projectiles comprising a metal having a higher density than lead and a metal having a lower density than lead. This patent does not disclose a composite comprising tungsten and bronze.

U.S. Pat. No. 5,894,644 discloses lead-free projectiles formed by liquid metal infiltration. In one embodiment, ferrotungsten is infiltrated by molten copper, tin or brass. Such composites do not have sufficient homogeneity to possess desirable processing characteristics and properties.

U.S. Pat. No. 5,950,064 discloses lead-free shot comprising a mixture of three metal components. This patent does not disclose a composite formed by mixing tungsten with bronze.

There still remains a need for a composite materials having a suitably high density, suitable processing characteristics and suitable properties for a variety of applications.

SUMMARY OF THE INVENTION

There is provided a composite comprising tungsten and bronze.

There is also provided a composite consisting essentially of tungsten, bronze, and iron.

There is also provided a process for producing a composite, the process comprising: blending powdered tungsten, powdered bronze, and an organic binder, thereby forming a homogeneous mixture; compounding the mixture at elevated temperature; and, cooling the mixture to form a composite having consistent characteristics throughout the composite.

There is also provided a process for producing an article comprising: providing a mold having an open ended cavity; placing a quantity of a homogeneous mixture of powders comprising tungsten and bronze in the cavity; placing a quantity of a powdered infiltrant on the mixture of powders in the cavity; sintering the mixture of tungsten and bronze powders at a first temperature followed by melting the infiltrant at a second temperature; and, cooling the mold and the articles formed therein.

BRIEF DESCRIPTION OF THE DRAWINGS

The invention will now be described by way of non-limiting example with reference to the following drawings, wherein.

DETAILED DESCRIPTION OF THE INVENTION

Figure 1A:
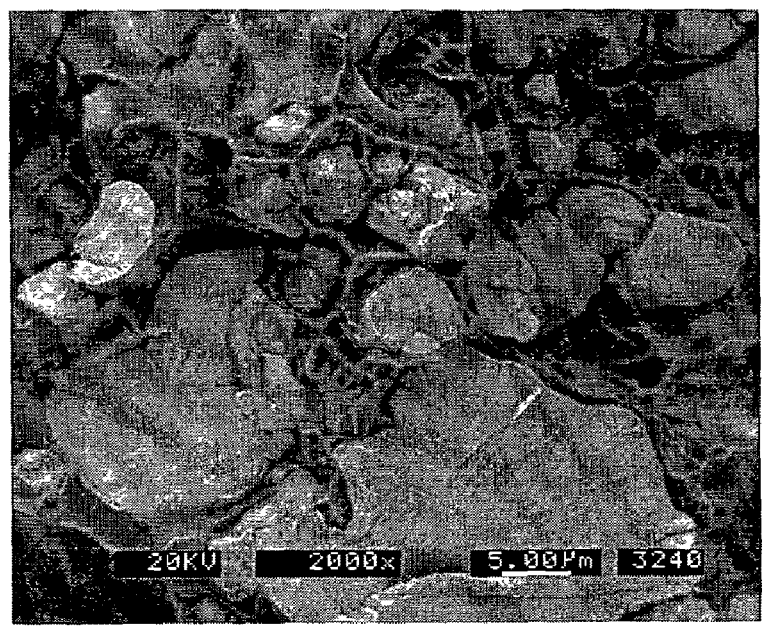
FIG. 1A is an electron micrograph at 2000× magnification showing the microstructure of the fracture surface of a composite of the present invention.

Tungsten is generally used in the form of tungsten powder of polygonal shape and may be milled to the desired shape and mean particle size. The mean particle size is preferably about 0.5–50 µm, more preferably about 1–20 µm.

Bronze is typically an alloy of copper and tin. The ratio of copper to tin may vary depending on the particular alloy and the desired proportions of copper to tin in the composite. Most industrially useful compositions have a tin content of under 25% by weight. Many other additions at various levels are commonly used to alter the properties of bronzes. These may include but are not limited to metals and non-metals such as zinc, iron, manganese, magnesium, aluminium, phosphorus, silicon, lithium compounds, etc. Preferably, bronze having a Cu:Sn ratio of about 9:1 is used, this includes bronze having a Cu:Sn ratio of 89:11. Bronze is preferably used in the form of a powder and may be milled to the desired shape and mean particle size. The mean particle size is preferably under 100 μm, more preferably under 50 μm.

Generally, the density of the composite can be adjusted at will by varying the ratio of tungsten (density=19.3 g/cc) and bronze (density=8.9 g/cc for a 90:10 alloy of Cu:Sn). A partial list is provided in Table 1.

It was found that a composite comprising 40–85% tungsten by weight of the composite, the balance being bronze comprising 80–95% copper and 5–20% tin by weight of the bronze, was effective at producing a composite suitable for use as a lead replacement. Preferably, the composite comprises 50 to 55% tungsten, even more preferably 52% tungsten by weight of the composite and the bronze comprises copper and tin in a ratio of about 9:1 by weight of the bronze.

Tungsten particles offer resistance to densification during compaction as well as sintering. These issues may place an upper limit on the useful fraction of tungsten. The latter issue can also be partially offset by using finer tungsten grains.

The use of bronze in the formation of tungsten composites offers significant advantages over composite materials that have previously been described in the art, including the three component systems described in U.S. Pat. No. 5,950,064. Surprisingly, it has been found that suspensions of tungsten in bronze are more homogeneous and denser than suspensions of tungsten in other materials, particularly other metallic materials. The more even distribution of tungsten in the bronze matrix leads to superior and more consistent composite properties, such as higher impact strength and greater density. The use of tungsten in bronze also permits the use of a wider range of processing characteristics than the use of a three component system, such as those described in U.S. Pat. No. 5,950,064. When processing a three component system involving separate powders of tungsten, copper and tin, molten tin will dissolve into the copper matrix leaving non-removable voids or porosity, permitting aggregation of the tungsten particles that were next to the tin particles. As a result, the composite formed from the three component system is less homogeneous and of lower density than one formed from tungsten and bronze.

Other processing aids may be used during the production of tungsten/bronze composites, such as lubricants (for example, organic polymers, waxes, molybdenum disulphide, calcium difluoride, ethylene-bis-stearamide, lithium stearate, lithium carbonate, copper stearate, copper oleate, copper amines, and graphite), surfactants (for example, stearic acid) mould releasing agents (for example, zinc stearate) and wetting agents (for example, aluminum and basic polymers such as polyvinyl pyrrolidone).

TABLE 1

Density of Composites Having Various Proportions of Tungsten and Bronze

| Tungsten loading (vol %) | Mixture density (g/cc) | Fractional weight of W powder | Fractional weight of bronze |
| --- | --- | --- | --- |
| 20.000 | 10.980 | 0.352 | 0.648 |
| 20.500 | 11.032 | 0.359 | 0.641 |
| 21.000 | 11.084 | 0.366 | 0.634 |
| 21.500 | 11.136 | 0.373 | 0.627 |

TABLE 1-continued

Density of Composites Having Various Proportions of Tungsten and Bronze

| Tungsten loading (vol %) | Mixture density (g/cc) | Fractional weight of W powder | Fractional weight of bronze |
| --- | --- | --- | --- |
| 22.000 | 11.188 | 0.380 | 0.620 |
| 22.500 | 11.240 | 0.386 | 0.614 |
| 23.000 | 11.292 | 0.393 | 0.607 |
| 23.500 | 11.344 | 0.400 | 0.600 |
| 24.000 | 11.396 | 0.406 | 0.594 |
| 24.500 | 11.448 | 0.413 | 0.587 |
| 25.000 | 11.500 | 0.420 | 0.580 |
| 25.500 | 11.552 | 0.426 | 0.574 |
| 26.000 | 11.604 | 0.432 | 0.568 |
| 26.500 | 11.656 | 0.439 | 0.561 |
| 27.000 | 11.708 | 0.445 | 0.555 |
| 27.500 | 11.760 | 0.451 | 0.549 |
| 28.000 | 11.812 | 0.458 | 0.542 |
| 28.500 | 11.864 | 0.464 | 0.536 |
| 29.000 | 11.916 | 0.470 | 0.530 |
| 29.500 | 11.968 | 0.476 | 0.524 |
| 30.000 | 12.020 | 0.482 | 0.518 |
| 30.500 | 12.072 | 0.488 | 0.512 |
| 31.000 | 12.124 | 0.493 | 0.507 |
| 31.500 | 12.176 | 0.499 | 0.501 |
| 32.000 | 12.228 | 0.505 | 0.495 |
| 32.500 | 12.280 | 0.511 | 0.489 |
| 33.000 | 12.332 | 0.516 | 0.484 |
| 33.500 | 12.384 | 0.522 | 0.478 |
| 34.000 | 12.436 | 0.528 | 0.472 |
| 34.500 | 12.488 | 0.533 | 0.467 |
| 35.000 | 12.540 | 0.539 | 0.461 |
| 35.500 | 12.592 | 0.544 | 0.456 |
| 36.000 | 12.644 | 0.550 | 0.450 |
| 36.500 | 12.696 | 0.555 | 0.445 |
| 37.000 | 12.748 | 0.560 | 0.440 |
| 37.500 | 12.800 | 0.565 | 0.435 |
| 38.000 | 12.852 | 0.571 | 0.429 |
| 38.500 | 12.904 | 0.576 | 0.424 |
| 39.000 | 12.956 | 0.581 | 0.419 |
| 39.500 | 13.008 | 0.586 | 0.414 |
| 40.000 | 13.060 | 0.591 | 0.409 |
| 40.500 | 12.112 | 0.596 | 0.404 |
| 41.000 | 13.164 | 0.601 | 0.399 |
| 41.500 | 13.216 | 0.606 | 0.394 |
| 42.000 | 13.268 | 0.611 | 0.389 |
| 42.500 | 13.320 | 0.616 | 0.384 |
| 43.000 | 13.372 | 0.621 | 0.379 |
| 43.500 | 13.424 | 0.625 | 0.375 |
| 44.000 | 13.476 | 0.630 | 0.370 |
| 44.500 | 13.528 | 0.635 | 0.365 |
| 45.000 | 13.580 | 0.640 | 0.360 |

The final composite may consist essentially of tungsten and bronze. However, as indicated previously, the composite may include other materials to alter properties, for example iron. In addition, as one skilled in the art will appreciate, incidental impurities, for example carbon, may be present that do not unduly affect the properties of the composite.

Figure 6:
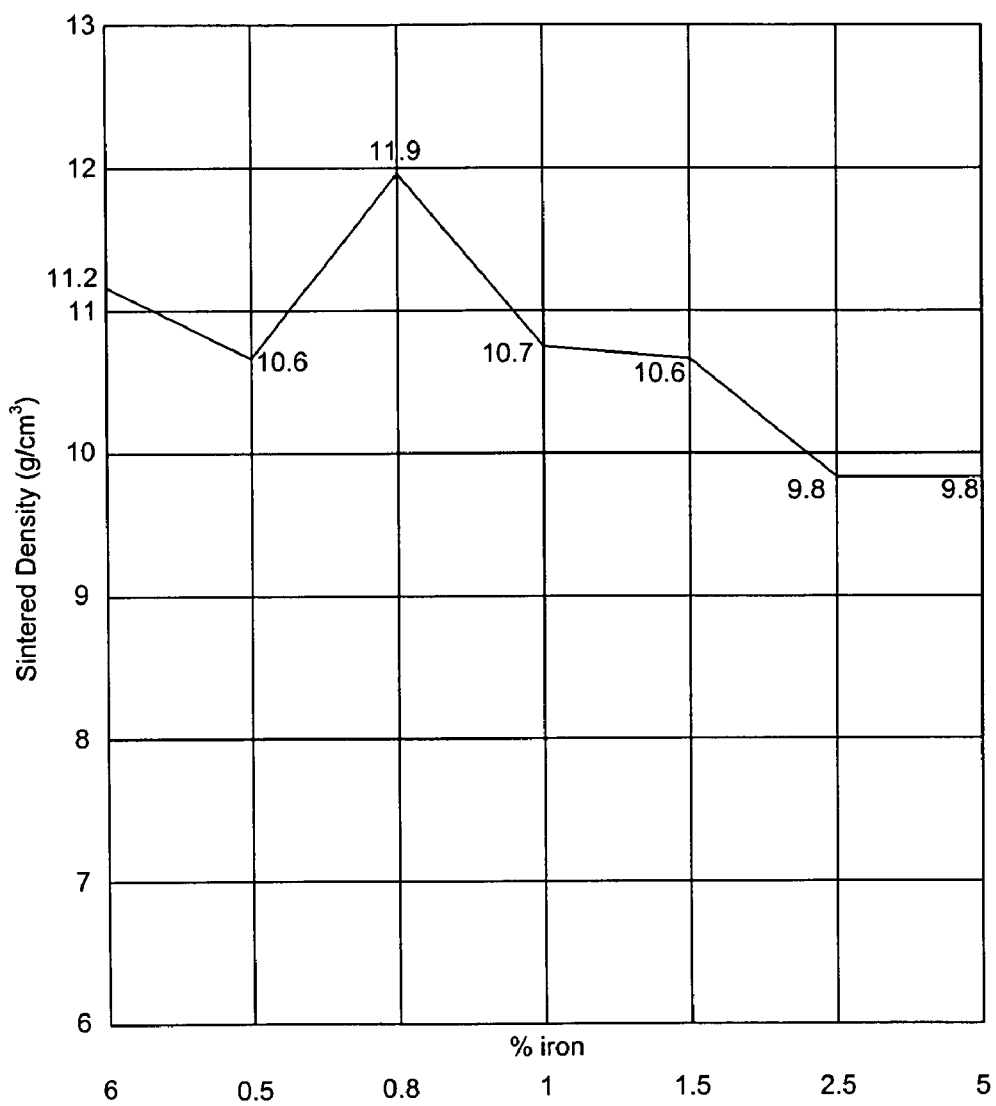
FIG. 6 is a plot of sintered density versus iron content for a composite of the present invention.

Iron may be added to the composite to increase the densification of the composite during sintering. Iron is readily dissolved in bronze, and tungsten dissolves more readily in iron than in bronze. The addition of iron to the composite has the effect of aiding the dissolution of tungsten into the bronze, improving the overall densification of the composite during sintering. Also, any carbon present in the composite does not readily dissolve in bronze, but does dissolve in iron. Iron therefore helps to dissolve and disperse carbon throughout the composite, minimizing the likelihood of carbon filled voids forming during sintering that would reduce the density of the composite. The effect of iron on composite density is illustrated in FIG. 6. Iron can be added in selected amounts to tailor the composite density over a narrow range to fit the requirements of a given application.

It was found that the addition of iron to the composite, preferably in the range of 0.5–5%, more preferably 0.8% by weight of the composite, was useful in affecting the composite density and especially useful in tailoring the composite density for a desired application.

An example of a composite according to the present invention consists essentially of tungsten, bronze and iron, preferably 52% tungsten, 47.2% bronze, and 0.8% iron by weight of the composite, the bronze consisting essentially of copper and tin in a ratio of 9:1 by weight of the bronze.

The composites of this invention can be used in a variety of articles such as projectiles or ammunition (for example, bullets, bullet cores and shot), weights (for example, wheel weights), radiation shielding and high-density gyroscopic ballasts, among others. Articles manufactured using the composite of the present invention enjoy a significant price advantage, typically 33–50%, over comparable articles manufactured using alternative commercially available lead replacements. Also, ammunition manufactured using the composite of the present invention exhibits ballistic performance at least equal to or better than that of ammunition manufactured using lead.

Numerous powder metallurgy forming techniques known in the art can be used to create composites according to the present invention and to mold the composites into articles. A number of processes are generally disclosed in *Manufacturing with Materials*, eds. Lyndon Edwards and Mark Endean, 1990, Butterworth-Heinemann, Oxford, UK; and, *Process Selection: From Design to Manufacture*, K. G. Swift and J. D. Booker, 1997, Arnold Publishers, London, UK, the disclosures of which are hereby incorporated by reference.

An example of a process for manufacturing an article, for example a bullet core, using a composite of the present invention involves mixing tungsten and bronze powders together with any other materials, for example iron, that may be present to alter the properties of the composite. A mold, for example made of a machinable ceramic material such as alumina, having a plurality of open ended cavities in the shape of the article to be manufactured is oriented with the open ends of the cavities facing up. The mixture of powders is then placed in the cavities and the mold is tapped to promote settling of the powders. A ram may optionally be used to compress the powders. An infiltrant, for example copper powder, is then placed on top of the mixed powders, generally filling the remainder of the cavity. The mold and powders are then sintered at a first temperature, for example 800–1000° C., for a sufficient time to promote densification of the tungsten and bronze, for example 1 to 3 hours. The mold and powders are then raised to a second temperature that is higher than the first temperature and sufficient to melt the infiltrant, for example 1000–1100° C. The infiltrant fills the voids in the sintered composite, typically increasing the final density to within 1–3% of the theoretical mixture density. Copper is particularly desirable for use as an infiltrant, since it raises the melting point of the bronze as it is introduced, thus avoiding slumping, and since it alloys with the bronze, thereby maintaining the corrosion resistance of the composite. Upon cooling, a dense final article is created with minimal slumping that is malleable and resists cracking sufficiently to allow cold shaping using, for example, swaging dies or other sizing processes.

In another type of manufacturing process, the composite of the present invention may be formulated using an organic binder, generally a thermoplastic binder, in sufficient quantity to allow use of fluid processing techniques to manufacture articles using the composite. A wax or blend of waxes is the preferred binder. The preferred binder comprises a low molecular weight wax or wax blend that preferably melts at a temperature from about room temperature to about 120° C., more preferably from about 50–90° C., yet more preferably from about 55–65° C. The wax may be, for example, paraffin wax, microcrystalline wax, polybutene wax, polyethylene wax, Carnauba wax, among others, or a blend of two or more thereof. The binder preferably has a thermal de-binding temperature that allows it to be completely removed from the composite material prior to sintering. The binder preferably has a pyrolysis temperature less than 375° C., even more preferably about 350° C., and preferably leaves little or no ash residue upon pyrolysis. Additionally, the binder should have a viscosity which changes gradually with temperature. A single melting point wax undergoes an abrupt change in viscosity when heated. Sudden shifts in viscosity can cause the metal powder to fall out of suspension in the binder, creating zones of non-flowing materials that may cause damage to equipment. To widen the useful temperature range of the binder and prevent sudden shifts in viscosity, a blend of low molecular weight waxes of various melting points may be used. Optionally, a surfactant may be added to promote adhesion of the powder to the binder and keeping the powders in suspension. The surfactant used is preferably pyrolysed at about the same temperature as the waxes and is preferably removed completely during de-binding without the formation of ash that may inhibit sintering of the composite.

An example of a binder according to the present invention includes a blend of paraffin waxes having melting points between 50 and 73° C. By adjusting the relative amounts of the waxes, the softening range and melting point of the binder may be tailored to the composite and the molding equipment being used.

Formulations of the composite that include an organic binder are generally made using a compounder. Tungsten and bronze powders are dry blended along with the organic binder and any other additional components, for example iron, that may be added to alter the properties of the composite. The result is preferably a homogeneous mixture. The mixture is then introduced into a compounder and compounded at elevated temperature. The temperature of the compounder is preferably less than the melting point of the binder, but high enough to allow the binder to soften, thereby allowing the binder and powders to be mixed, for example 55–65° C. The compounder typically has a heated bore with a screw or twin screws and a series of paddles or cams for slicing and shearing the mixture during compounding. This type of compounder permits good control over particle distribution and loading resulting in high volume throughput and good mixture consistency and homogeneity. The compounder typically produces a pelletized mixture that may be cooled for later use in the molding of articles using fluid processing techniques.

Examples of processes for making articles that use organic binders and fluid processing techniques include Powder Injection Molding (PIM), tape casting, and polymer-assisted extrusion. These techniques all involve an organic binder that contributes fluidity to the composite thus permitting the forming of molded shapes.

In recent years, Powder Injection Molding (PIM) has emerged as a method for fabricating precision parts in the aerospace, automotive, microelectronics and biomedical industries. The important benefits afforded by PIM include near net-shape production of articles having complex geometries in the context of low cost and rapid fabrication at high production volumes.

The overall PIM process consists of several stages. Metal powders and organic materials that include waxes, polymers and surfactants are compounded as previously described to form a homogeneous mixture that is referred to as the feedstock. The feedstock may, for example, be pelletized. Ideally, the feedstock is a precisely engineered system. The constituents of the feedstock are selected and their relative amounts are controlled in order to optimize their performance during the various stages of the process. The feedstock is used to mould parts in an injection moulding machine, in a manner similar to the forming of conventional thermoplastics.

The injection molding machine has a feed hopper which supplies feedstock to an elongated processing barrel. The processing barrel may be jacketed and is heated to the desired molding temperature. The molding temperature is preferably below the melting point of the binder but high enough to soften the binder, for example 55–65° C. The barrel typically contains an elongated screw concentrically aligned with the barrel. The barrel is generally tapered and as the screw is rotated, the softened material is advanced through the barrel under an increasing pressure. A mold having an internal cavity corresponding in shape to the article being manufactured is provided at the outlet of the barrel and receives an injection of the heated pressurized material. The material is cooled in the mold under predetermined pressure and temperature conditions to plasticize the binder and the formed article is removed from the mold for further processing. Injection molding is particularly useful for manufacturing wheel weights and bullets.

Additional shape forming methods that make use of fluid processing techniques will be described below.

Extrusion and injection molding are typically done at elevated temperatures. Extrusion is generally a melt-processing technique that involves mixing the metal constituents and the organic binder at an elevated temperature followed by extruding the molten mixture through an open die into the form of wires, sheets or other simple shapes. Tape casting usually involves mixing metal constituents with a solution of organic binder and extruding the mixture at room temperature into sheets. These techniques are fairly slow for the commercial production of shot but may be most applicable to the manufacture of articles like wheel weights and bullets.

Compaction is another technique wherein composite ingredients including organic binder are pressed to form a compact. The compact may then be sintered at an elevated temperature. Compaction techniques of this nature are typically not viable for the volume production of articles such as shot.

In yet another technique, particularly adapted to producing shot, the ingredients of the composite including organic binder are mixed together and the binder is melted and dripped into small spheres.

Heading or roll-forming techniques, either cold or warm, are more rapid than casting, moulding, pre-forming or dripping techniques and are ideally suited to the manufacture of ammunition, such as shot, since high throughput is required to make the process more economical. Generally, tungsten and bronze are mixed together to form a suspension and extruded to form a wire, strip or sheet. The wire, strip or sheet may then be processed into the desired article. For the production of shot, the wire, strip or sheet is stamped or rolled out to give substantially or essentially spherical composite particles. Press rolls may also be used to press the extruded composite into a desired thickness before the spherical composite particles are formed. The spherical composite particles may then be finished to produce shot.

In such heading or roll-forming processes, tungsten and bronze may be pre-mixed to form a pre-mixture and charged to an extruder; or, they may be pre-mixed then compounded and pelletized, and charged to an extruder. Pre-mixing is generally done at ambient (room) temperature. Bronze, together with any other additives that may be used, are typically mixed first to form a mixture which is then mixed with tungsten to form the pre-mixture. Compounding and pelletization is typically done at an elevated temperature. The extruded composite, in the form of a wire, strip or sheet, may then be stamped progressively using a series or an array of punches to form regular indentations until the spherical composite particles are finally stamped out. Alternatively, spinning rolls with a dimpled texture may be used to form spherical composite particles.

In another aspect of the invention that may be used to form a variety of articles, special processing steps and binder selection allow the cooled and solidified article to have a high powder content (beyond the limit of random order) such that when reheated the object will not lose its shape. Use of such a binder dramatically improves the processibility of the composite permitting the formation of a pourable mixture that can be easily formed into the desired shape. The filled moulds may be vibrated lightly to create a more ordered packing arrangement of the powder particles. Successful reproductions may be formed with highly repeatable accuracy and powder loading.

Following the shape forming stage as described in any of the foregoing methods, removal of organic constituents may be achieved by pyrolysis prior to sinter densification of the article. The process of removal of the binders is referred to as debinding in general, and the pyrolysis method of binder elimination is termed as thermal debinding. The thermal debinding operation involves heating the shaped article in a furnace to a temperature that rapidly transforms the binder by pyrolysis into gaseous products that are swept away by a flowing protective atmosphere. As the article is heated, the binder melts. A wicking powder, for example a powder comprising alumina, may be used to create a capillary force gradient that draws the binder out of the part. Since melting of the binder occurs from the outside in, the entire article is not liquefied at one moment. As the liquid front moves from outside to centre, it is immediately drawn out by the wicking powder. Much is known about the removal of such binders in this manner, and the calculations are well published to determine the basis of operation.

Solvent de-binding using a liquid organic solvent, for example heptane, heated to a temperature below its boiling point but greater than the melting point of the organic binder, for example 70° C., may optionally be used prior to thermal de-binding. When solvent de-binding is used as a pre-treatment, a portion of the liquid binder is removed by the solvent and a wicking powder is generally not needed during thermal de-binding.

Once the de-binding is complete the furnace is heated to a temperature adequate for the degree of sinter bonding required for the application. Typically, the temperature may be from about 600–1100° C. For composites according to the present invention, the sintering temperature is preferably 800–1100° C., more preferably 1000–1100° C. Sintering is generally done under a reducing atmosphere to prevent oxidation of the metal components. A protective gas, for example, pure hydrogen gas, a 10% hydrogen/90% nitrogen gas mix or cracked ammonia gas, may be used to provide a reducing atmosphere. The gas usually flows at from 5 to 10 times the volume of the furnace per hour to remove impurities. Batch or continuous furnaces may be used for thermal de-binding and sintering. In a batch furnace, the desired temperature profile versus time is typically programmed into the furnace. After completion of the program, the parts are left in the furnace under a controlled atmosphere for cooling. In a continuous furnace, the molded articles are introduced to the furnace on a moving belt conveyor and a large flow of protective gas is used to maintain the controlled atmosphere in the furnace. The furnace is programmed with zones of varying size and temperature to produce the desired temperature profile as the articles move through the furnace. Cooling of the articles usually occurs outside of the furnace under a controlled atmosphere. Either type of furnace may be used to manufacture articles according to the present invention.

To alter the surface properties of articles manufactured using a composite according to the present invention, the articles may be mechanically plated with another metal. The plating metal may be, for example, tin, zinc, chromium, molybdenum, or mixtures thereof, including alloys. The plating may be useful in imparting corrosion resistance, hardness, or lubrication to the article. The metals may be mechanically plated on to the articles by, for example, introducing the articles and the powdered plating metals into a ball mill and tumbling the articles and powders in the ball mill. Altering the surface properties in this manner in no way changes the structure or composition of the composite according to the present invention.

EXAMPLES

Example 1

A powdered bronze alloy with a 90:10 ratio of Cu:Sn was mixed with tungsten powder in a 1:1 blend by weight. The mixture was compacted in the shape of rectangular bars with 0.5% ethylene-bis-stearamide lubricant at 50 psi compaction pressure. The bars were sintered at 1100 C. to produce sintered bars consisting essentially of tungsten particles dispersed in a bronze matrix. The bars had a sintered density of 11.3 g/cc and a transverse rupture strength of 600 MPa. The resulting component had high impact toughness hitherto unseen in tin-tungsten composites.

Figure 1B:
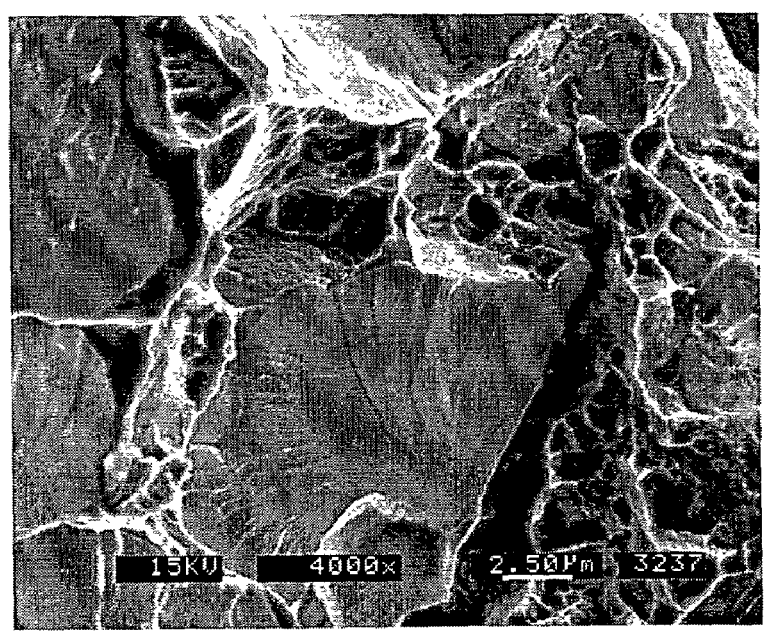
FIG. 1B is an electron micrograph at 4000× magnification showing the microstructure of the fracture surface of a composite of the present invention.
Figure 2:
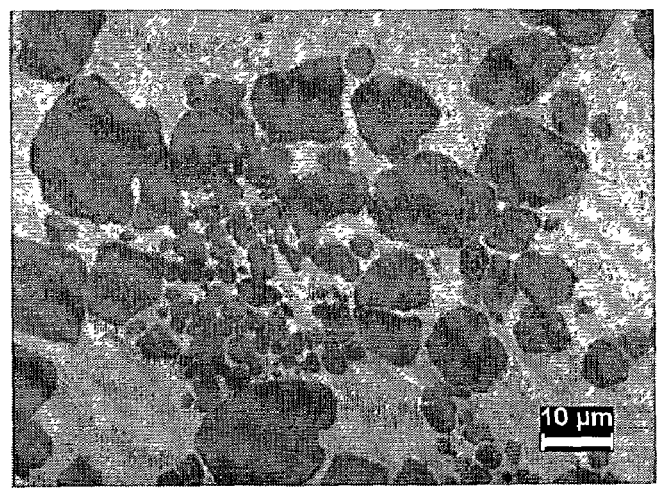
FIG. 2 is an optical micrograph of a composite of the present invention showing tungsten particles dispersed in a bronze matrix.
Figure 3A:
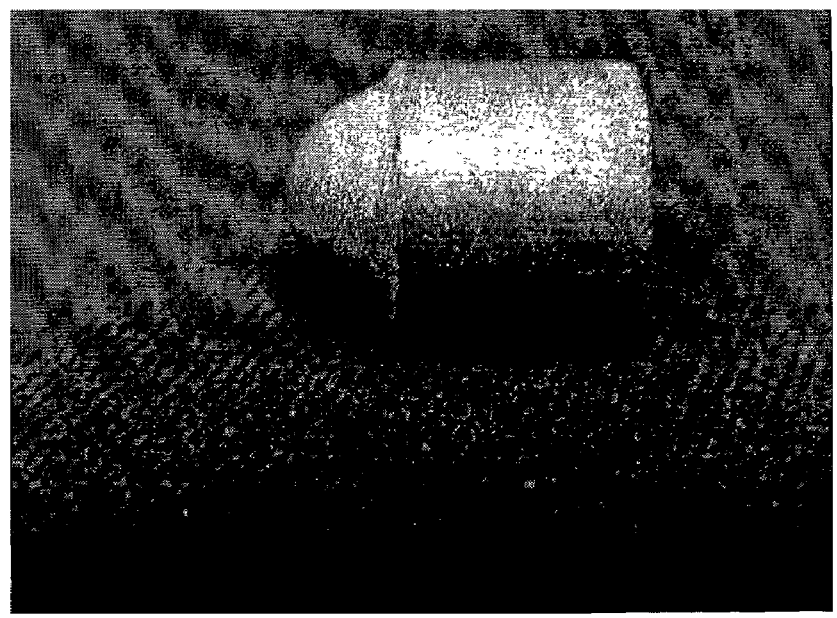
FIG. 3A is a photograph of a bullet comprising a tungsten-bronze composite of the present invention.
Figure 3B:
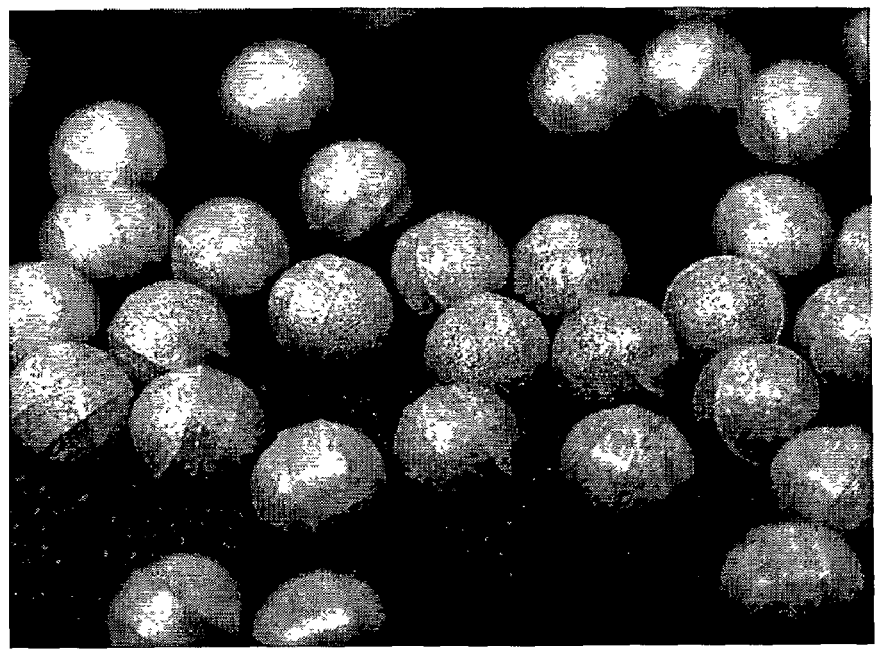
FIG. 3B is a photograph of shot comprising a tungsten-bronze composite of the present invention.
Figure 3C:
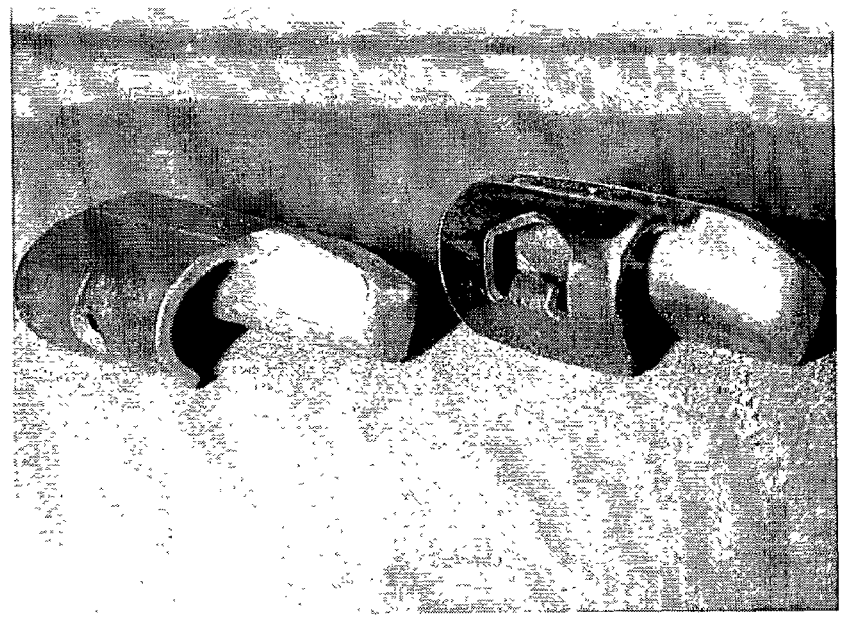
FIG. 3C is a photograph of a wheel weight comprising a tungsten-bronze composite of the present invention.

The microstructure of the fracture surface showed ductile fracture with relatively high wettability of the tungsten grains (FIGS. 1A and 1B). Optical micrographs of the bulk of the composite confirmed the presence of wetted tungsten particles dispersed in a bronze matrix (FIG. 2).

Example 2

A mixture comprising 60% by weight of tungsten powder and 40% by weight of bronze powder is mixed with a blend of waxes comprising 20% by weight paraffin wax, 40% by weight microcrystalline wax and 40% by weight Carnauba wax at 190° F. (about 88° C.) under 28 inches of vacuum for 30 minutes, such that the wax blend comprises 55 vol % of the metal/wax mixture. The metal/wax mixture is then brought back to atmospheric pressure and poured into a preheated rubber mould (about 82° C.). The filled mould is vibrated and returned to 26 inches of vacuum for one minute in a heated oven (about 82° C.), with vibration continuing for 5 minutes. The filled mould is then removed from the oven and allowed to cool until below about 27° C.

Debinding is then done at about 300° C. for 1 hour, then at 450° C. for 1 hour and finally at 550° C. for 1 hour under an atmosphere of hydrogen gas. Sintering is then done at a temperature of 850° C. for 1 hour under hydrogen gas.

Parts made using this process have high impact strength together with excellent ductility and energy absorption capability. Repeatedly hammering a tungsten-bronze pellet made using this process results in almost total flattening of the pellet without breaking. The flattened pellet is very hot to touch.

Example 3

To determine the effect of varying the relative chemical composition of the material, several different compositions were tested and the average density of the composite material was measured. The results are presented in Table 2. In Table 2 all samples containing 52% tungsten were prepared using the method and conditions described in Example 5, with all remaining results presented in Table 2 having been produced by the method and conditions described in Example 6.

TABLE 2

Material composition and average composite density

| Experimental Series | Material Composition | Density (g/cm$^3$) |
|---|---|---|
| 1 | 50W-50Cu | 10.8 |
|   | 50W-7.5Sn-42.5Cu (6.4 g/cm$^3$ tap density W) | 10.58 |
|   | 50W-7.5Sn-42.5Cu (10 g/cm$^3$ tap density W) | 10.7 |
|   | 55W-4.5Sn-40.5Cu | 10.3 |
|   | 50W-5Sn-45Cu | 10.6 |
|   | 45W-5.5Sn-49.5Cu | 10.65 |
|   | 40W-6Sn-54Cu | 10.45 |
| 2 | 54W-1Sn-45Bronze(90Cu10Sn) | 11.2 |
|   | 50W-5Sn-45Bronze(90Cu10Sn) | 10.6 |
|   | 50W-50Bronze(80Cu20Sn) | 10.9 |
|   | 82W-18Bronze(90Cu10Sn) | 9.3 |
|   | 72W-28Bronze(90Cu10Sn) | 10.3 |
|   | 62W-38Bronze(90Cu10Sn) | 11.0 |
|   | 52W-48Bronze(90Cu10Sn) | 11.2 |
| 3 | 52W-47.5Bronze(90Cu10Sn) 0.5Fe | 10.6 |
|   | 52W-47.2Bronze(90Cu10Sn) 0.8Fe | 11.9 |
|   | 52W-47Bronze(90Cu10Sn) 1Fe | 10.7 |
|   | 52W-46.5Bronze(90Cu10Sn) 1.5Fe | 10.6 |
|   | 52W-45.5Bronze(90Cu10Sn) 2.5Fe | 9.8 |
|   | 52W-43Bronze(90Cu10Sn) 5Fe | 9.8 |

Figure 4:
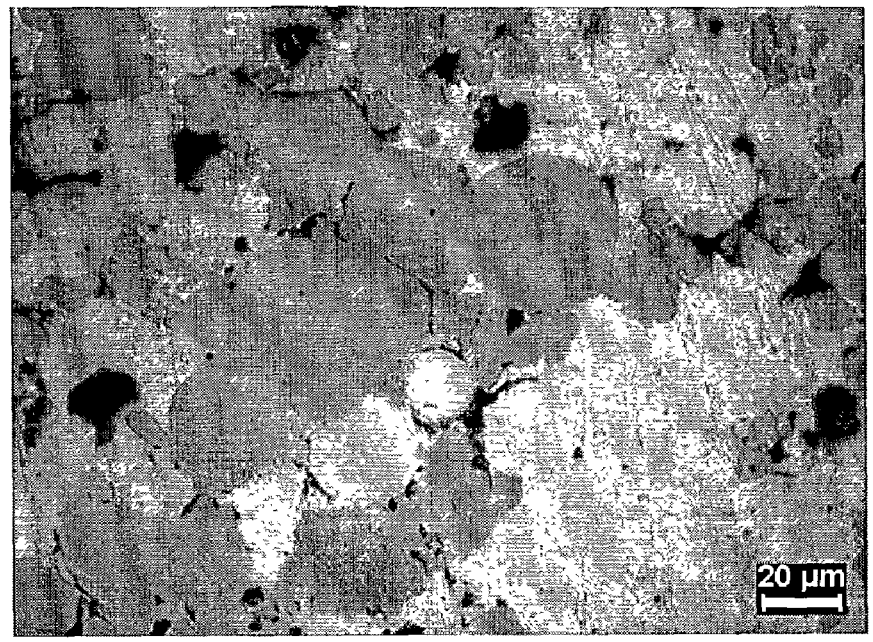
FIG. 4 is an optical micrograph at 500× magnification of a composite of the present invention made using separate tungsten, copper, and tin powders.
Figure 5:
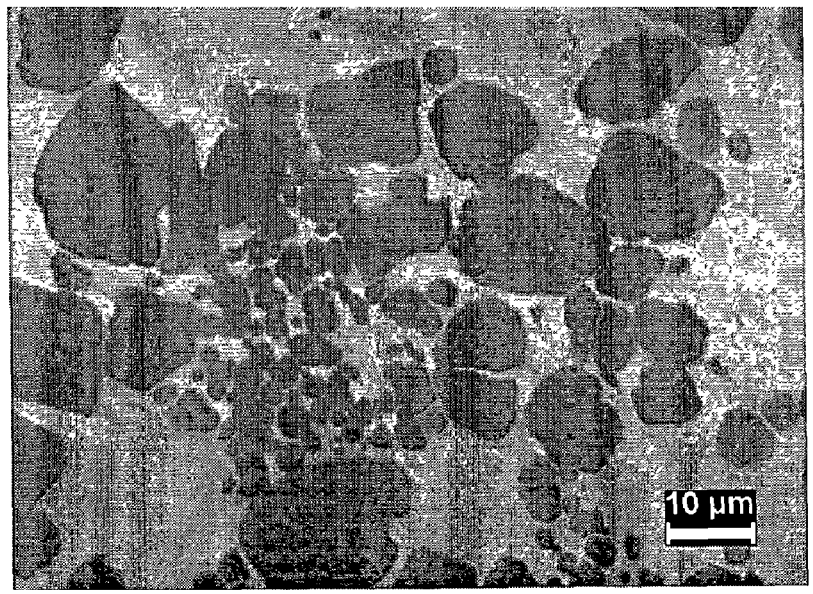
FIG. 5 is an optical micrograph at 1000× magnification of a composite of the present invention made using tungsten and bronze powders.

The densities shown in Table 2 are the avenge for a number of samples tested. Sintering was for one hour in a 100% hydrogen atmosphere with a temperature between 1080 and 1100 C., depending on the composition being made. In the first series of experiments, the composite material was made by mixing tungsten, copper, and tin powders. The numeral preceding the chemical symbol of each constituent indicates the weight percentage of that constituent in the composite. In the first experimental series, a variety of compositions were tested, producing a variety of composite densities. None of the composite densities proved acceptable, however, due primarily to the presence of voids in the particles formed by the dissolution of tin into the copper along the copper grain boundaries. The appearance of voids is illustrated in FIG. 4, which shows a three component composite material made during the first series of experiments in cross section at 500 times optical magnification, with the voids clearly visible as dark black spots. To prevent void formation, the next series of experiments was conducted using bronze powder. The ratio of copper to tin in the bronze powder is indicated in brackets. Using bronze rather than separate copper and tin powder proved effective at preventing void formation in the composite, as indicated in FIG. 5, which shows a two component composite material made during the second series of experiments in cross section at 1000 times optical magnification. In contrast to FIG. 4, no voids are visible when a bronze powder and a tungsten powder are used to form the composite material. In the third series of experiments, a small amount of iron was added to the composite. The number preceding the chemical symbol for iron indicates the weight percentage of iron in the composite. The iron improved the sintering of the materials and had a noticeable effect on density. As illustrated in FIG. 6, the maximum density for the compositions tested was at 0.8% iron by weight, with too much or too little iron having a detrimental effect on composite density. The composite consisting essentially of 52W-47.2Bronze(90Cu10Sn) 0.8Fe had a density of 11.9 g/cm$^3$.

Example 4

To arrive at the desired binder formulation, experiments were conducted with a variety of wax blends and surfactants. Low molecular weight paraffin waxes were selected from Table 3 and blended in a variety of combinations.

TABLE 3

Paraffin waxes for blending experiments (Source: Strahl & Pitsch, West Babylon, NY)

| S & P Number | Melting Point Open Cap. Tube USP Class II | Penetration ASTM D-1 321100/77/5 | Acid Value | Saponification Value | Color |
|---|---|---|---|---|---|
| 206 | 122–127° F. | 18–43 | Nil | Nil | White |
| 192 | 124–130° F. | 9–15 | Nil | Nil | White |
| 227B | 128–135° F. | 11–16 | Nil | Nil | White |
| 1275 | 127–135° F. | 11–16 | Nil | Nil | White |
| 173 | 138–144° F. | 10–16 | Nil | Nil | White |
| 673 | 141–146° F. | 10–15 | Nil | Nil | White |
| 434 | 150–156° F. | 10–16 | Nil | Nil | White |
| 674 | 156–163° F. | 10–15 | Nil | Nil | White |

Note: EPA - Toxic Substances Control Act - Chemical Substance Inventory, Substance Name Index - PARAFFIN WAX / CAS NUMBER 8002-74-2, Cosmetic, Toiletry & Fragrance Association - Cosmetic Ingredient Dictionary, CAS NUMBER 800-74-2

All of the paraffin waxes in the above table have a melting point between 122° F. (50° C.) and 163° F. (73° C.). Combining waxes of various melting points has the effect of increasing the softening of the wax over a range of temperatures. This is in contrast to the sharp transition from solid to liquid over a relatively narrow temperature range for a single wax, as listed above. By blending the binders, a more gradual shift from solid to liquid is created, which provides a range of operating temperatures that are compatible with commercial compounding and molding equipment. Additionally, stearic acid (Fisher Scientific: Atlanta, Ga.) was selected as a surfactant for use in helping to keep metal powder suspended within the binder, due to its comparable melting point of 54° C. and since it burns cleanly without leaving an ash residue.

By blending various waxes and stearic acid in a number of combinations and qualitatively observing the softening and melting points, the blend of materials shown in Table 4 was selected.

TABLE 4

Blend of materials in preferred binder formulation

| Organic Material | Melting Point (° C.) | Weight Percentage (%) |
|---|---|---|
| S&P 206 | 50–53 | 31.3 |
| S&P 1275 | 53–57 | 34.9 |
| S&P 674 | 69–73 | 31.3 |
| Stearic Acid | 54 | 2.5 |

For a binder formulated using the blend of materials in Table 4, the physical properties listed in Table 5 were observed by measuring the temperature of the binder upon qualitative observation of the indicated parameter.

TABLE 5

Physical properties of binder formulated as per Table 4.

| Binder Parameter | Temperature (° C.) |
|---|---|
| Softening of binder | 45–55 |
| Melting of binder | 55–65 |
| Flash Point (in air) | 230 |

Example 5

Figure 7:
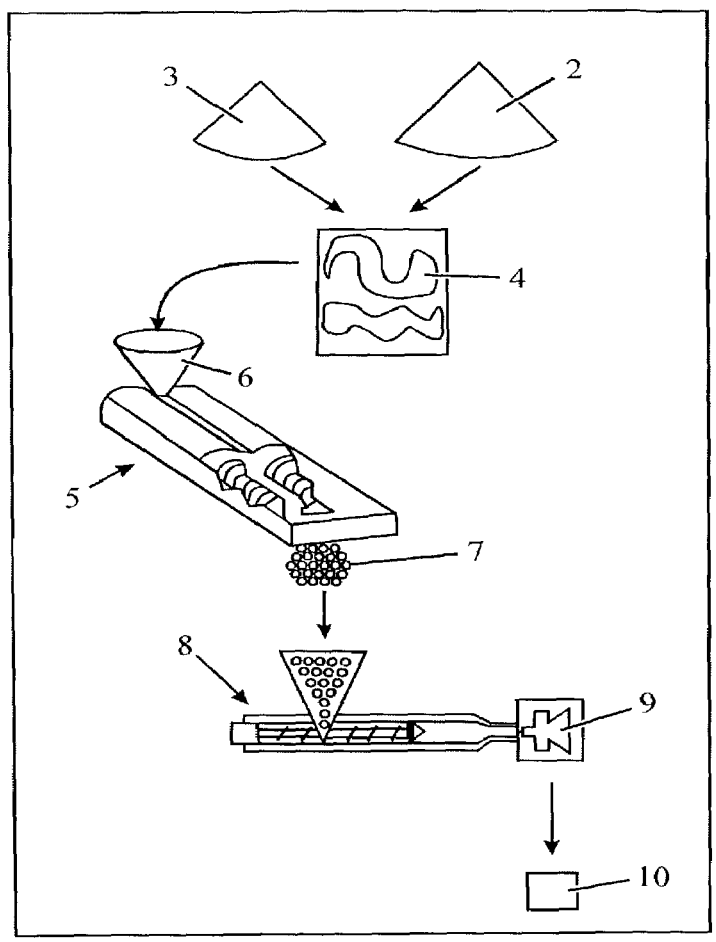
FIG. 7 is a schematic of a process for manufacturing a composite of the present invention.

A process for manufacturing the composite of the present invention is shown schematically in FIG. 7. The tungsten powder 2 and the bronze powder 3 were dry blended together with a small amount of iron and an organic binder 4. The dry blender used was a double cone 500 lb capacity heavy duty tumbler with an open volume of approximately 12 liters, rotating at 30 rpm for approximately 15 minutes. The composition of the blended powders is provided in Table 6.

The total experimental batch size was 1000 cm$^3$ and the blended batch had an overall density of approximately 8.05 g/cm$^3$. It is important to maximize the solid volume fraction prior to compounding to ensure good pellet formation.

TABLE 6

Composition of blended powders

| Powders | Weight Percentage (%) | Density (g/cm³) | Mass (g) |
|---|---|---|---|
| Bronze (90Cu10Sn) | 47.2 | 8.9 | 3641.87 |
| Tungsten (W) | 52 | 19.3 | 4012.23 |
| Iron (Fe) | 0.8 | 7.8 | 61.73 |
| Total Metal Powders | 100 | 12.35 | 7715.83 |
| S&P 206 | 31.3 | 0.88 | 104.36 |
| S&P 1275 | 34.9 | 0.89 | 116.37 |
| S&P 674 | 31.3 | 0.90 | 104.36 |
| Stearic Acid | 2.5 | 0.86 | 8.34 |
| Total Organic Binders | 100 | 0.89 | 333.43 |
| Total Batch Weight | | | 8049.26 |

The powders were compounded into pellets using a compounder 5. The compounder 5 was a 2" diameter twin-screw compounder with a single feed port 6 for receiving the mixed powders (Readco: York, Pa.). The feed port 6 was electrically heated to 65° C. and included a feed tube that was air cooled to approximately 23° C. The compounder was oil jacketed and had a homogeneous temperature throughout of 65° C. A self-pelletizing two hole die plate was installed at the outlet of the coupounder. The die plate was not heated, but reached a temperature of 65° C. The powders were fed through the coupounder at a rate of 100 kg/hr with a screw rotation rate of 150 rpm, consuming 1.2 HP of electrical power. The pelletized material 7 was collected, tumbled for 5 minutes, and compounded a second time to ensure homogeneity of the compounded material.

The pellets 7 were then fed to an injection molding machine 8. The injection molding machine 8 was a 55 ton type 270V 500–150 (Arburg: Lossburg, Germany) with a PVC processing barrel and screw of a type suitable for PIM applications. The mold 9 was a long sprue type with four insert cavities. Two molds 9 were used, one designed to produce tensile bars and the other designed to produce 9 mm bullets. The mold was jacketed and cooled to 10° C. The parameters used in the operation of the molding machine 8 are provided in Table 7.

TABLE 7

Molding parameters

| Mold parameter | Value |
|---|---|
| Mold temperature | 10° C. |
| Material charge | 25 cm³ |
| Injection time | 0.4 s |
| Injection speed | 75 cm³/s |
| Injection pressure | 500 bar |
| Holding pressure | 500 bar, 0.5 s |
| | 200 bar, 2 s |
| Cooling time | 12 s |
| Pressure during plasticizing | 200 bar |

The resulting molded articles were then subjected to de-binding. In this series of experiments, the optional solvent de-binding system was not used and the articles were placed in alumina powder for wicking of the wax. The articles were placed in a furnace 10 with a 100% hydrogen atmosphere flowing at 10 times the furnace volume per hour. The furnace temperature was ramped at 5° C. per minute until it reached a temperature of 350° C. The temperature was then held at that level until all of the binder was removed, as measured by a drop in the furnace exhaust flame temperature after about 2 to 2.5 hours.

Without removing the articles from the furnace 10, the parts were sintered by ramping the temperature at 5° C. per minute until the temperature reached 1080° C., where it was held for 1 hour. The articles were then allowed to cool in the furnace 10 in the inert gas atmosphere before being removed from the furnace.

The physical and mechanical properties of the cooled composite articles were measured and are reported in Table 8.

TABLE 8

Physical and mechanical properties of 52W-47.2Bronze(90Cu10Sn)0.8Fe

| Property | Value |
|---|---|
| Average density | 11.9 g/cm³ |
| Porosity | 4% |
| Shrinkage | 12.72% |
| Brinnell Hardness | 87–90 |
| Tensile Strength | 87,000 lbs/in² |

The density of the material was determined using Archimedes principle in oil. The finished parts had an average density of 11.9 g/cm³, which is 96% of the theoretical density for the combination of metal powders of 12.35 g/cm³, calculated in Table 6. This indicated that the material produced using the above process had a porosity of about 4%. During de-binding and sintering, the average dimension was reduced by 12.72% due to the removal of the organic binder and densification of the metal particles during sintering. Molds to produce the articles made from this composite should be scaled up by a factor of 1.14 to account for this shrinkage in the final parts. This combination of physical properties is particularly desirable for composite materials that can be used as lead replacements.

Example 6

To manufacture an article, particularly a 5.56 mm bullet core for a full metal jacket bullet, in an alternative process, a mold was made from a machinable ceramic comprising alumina. A plurality of cavities corresponding in shape to a bullet core were machined into the ceramic and the mold was oriented so that the open ends of the cavities faced up. A mixture of powders consisting essentially of 52% tungsten and 48% bronze by weight of the mixture, the bronze consisting essentially of 90% copper and 10% tin by weight of the bronze, was prepared and homogeneously mixed using a dry blender. No organic binder was present in the mixture of powders. The mixture was poured into the cavities and the mold was tapped lightly to settle the powders in the cavities. The powder was then compressed using a ram of the same diameter as the cavity to create a specific empty volume above the level of the mixed powders. An infiltrant powder comprising copper was then added to the empty volume of all but three of the cavities and the mold was tapped to settle the infiltrant powder. The infiltrant powder was added in an amount of about 11% of the weight of the mixed tungsten and bronze powders.

The filled mold was placed in a furnace with a pure hydrogen atmosphere flowing at 5 times the furnace volume per hour. The temperature of the furnace was increased at a rate of 10° C. per minute until the temperature reached a first temperature of 840° C., where it was held for one hour to cause sintering and densification of the mixed tungsten and bronze powders. The first temperature was below the melting point of copper, 1083° C. The furnace temperature was then elevated at a rate of 10° C. per minute until the temperature reached a second temperature of 1100° C., where it was held for one hour to cause infiltration of the melted copper into the sintered tungsten bronze matrix. The mold and bullet cores were then allowed to cool in the furnace under a protective atmosphere of hydrogen.

Figure 8:
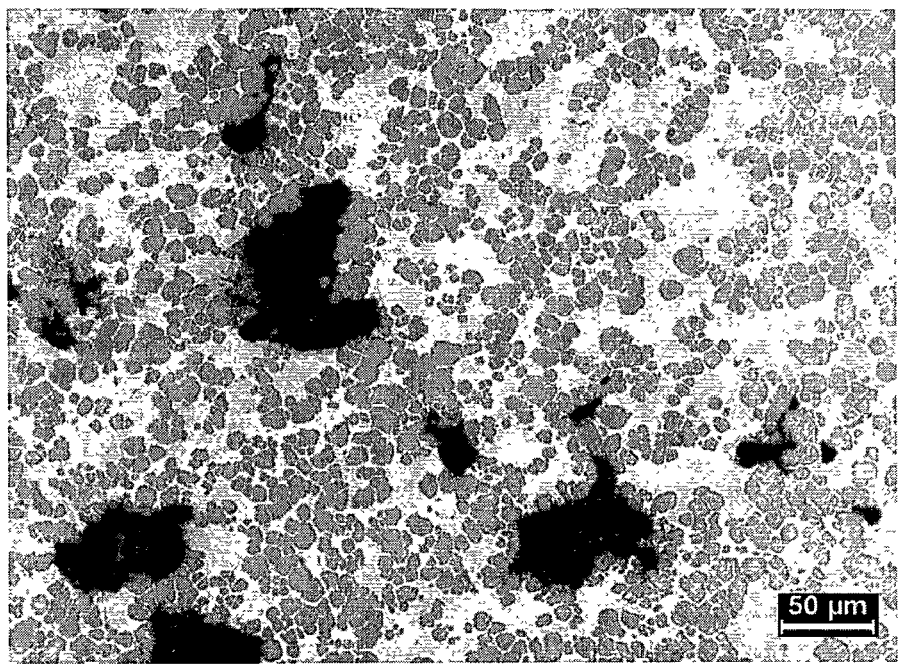
FIG. 8 is an optical micrograph at 200× magnification of a composite made in a mold having an open cavity without using an infiltrant.
Figure 9:
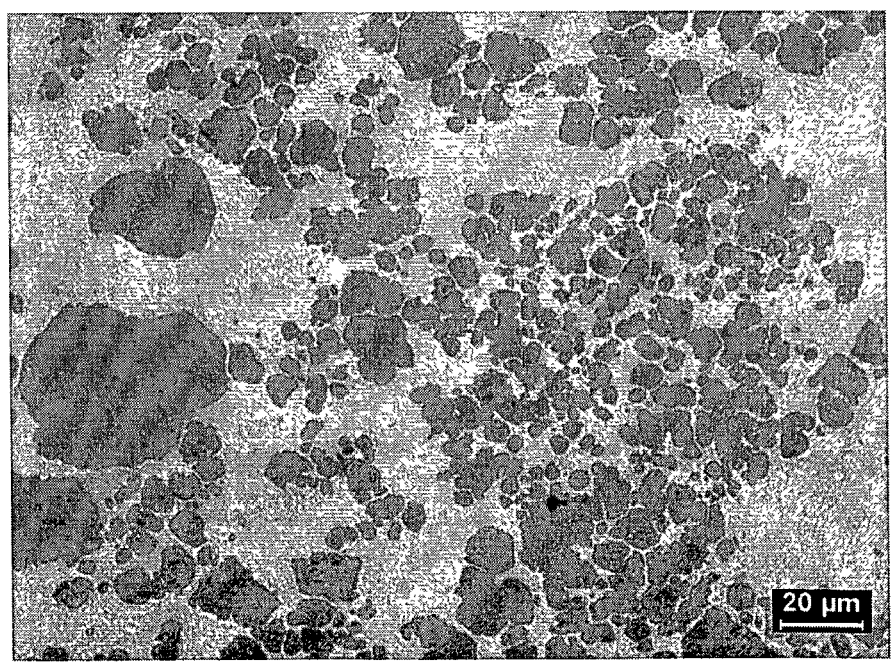
FIG. 9 is an optical micrograph at 500× magnification of a composite made in a mold having an open cavity using an infiltrant.

Analysis of the bullet cores without infiltrant showed that approximately 86% of the theoretical density was achieved during sintering, leaving a porosity of 14%. An optical micrograph of a cross section of one of these cores is provided in FIG. 8, showing dark black voids that were left after sintering. The cores with infiltrant had a density of approximately 97% of the theoretical density, indicated that the molten copper had infiltrated the pores. An optical micrograph of a copper infiltrated core is provided in FIG. 9, showing an absence of voids and tungsten grains well distributed in a bronze matrix with no individual copper grains present.

The final density and weight of the bullet cores were tailored to a military specification for this size of bullet core using the composite and process of the present invention. The bullet cores met the specification with an average density of 11.4 g/cm$^3$ and an average weight of 62 gr+/−0.5 gr (4.018 g+/−0.032 g). The bullet cores had minimal slumping and distortion and were malleable enough to allow shaping using swaging dies to bring the bullet cores to exact final dimensions.

Example 7

Figure 10:
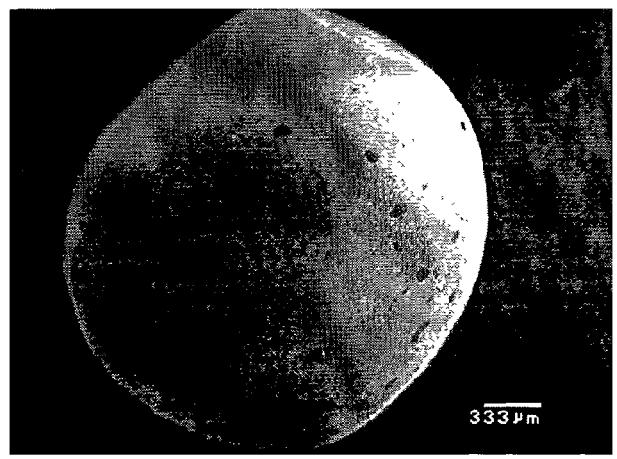
FIG. 10 is an electron micrograph of a composite shot of the present invention mechanically plated with tin.

To reduce the potential for corrosion, the composite material was mechanically plated with tin. Approximately 100 g of substantially spherical shot having an average diameter of 3.2 mm was placed in a ball mill with 20 g of tin powder having a mean diameter of 6 μm and 10 hardened steel ball bearings with a diameter of 20 mm. The ball mill was operated at 270 rpm for 1 hour. The resulting shot was analyzed using a scanning electron microscope (SEM), as shown in FIG. 10. The surface of the shot appeared smooth and shiny, indicating that some of the tin had mechanically plated on to the surface of the shot. A cross section of the shot analyzed using elemental mapping showed that a continuous layer of tin approximately 1 μm thick had been mechanically plated on to the shot.

Other advantages which are inherent to the structure are obvious to one skilled in the art. It is apparent to one skilled in the art that many variations on the present invention can be made without departing from the scope or spirit of the invention claimed herein.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying figures is to be interpreted as illustrative and not in a limiting sense.

Having described the invention, what is claimed is:

1. A composite consisting essentially of liquid phase sintered tutgsten particles in a copper/tin bronze matrix.

2. The composite of claim 1, wherein the tungsten is present in the composite in an amount of from 40% to 85% tungsten by weight of the composite.

3. The composite of claim 2, wherein the tungsten is present in the composite in an amount of from 50% to 55% tungsten by weight of the composite.

4. The composite of claim 1, wherein the bronze consists essentially of 80% to 95% copper by weight of the bronze, the balance being tin.

5. The composite of claim 4, wherein the bronze consists essentially of copper and tin in a ratio of about 9:1 by weight of the bronze.

6. The composite of claim 1, consisting essentially of 52% tungsten and 48% pre-alloyed copper/tin bronze by weight of the composite, the bronze consisting essentially of copper and tin in a ratio of about 9:1 by weight of the bronze.

7. The composite of claim 1, wherein the tungsten has a mean particle size of from 0.5 to 50 μm and the bronze has a mean particle size of less than 100 μm.

8. The composite of claim 7, wherein the tungsten has a mean particle size of from 1 to 20 μm and the bronze has a mean particle size of less than 50 μm.

9. The composite of claim 1, wherein the composite consists essentially of from 45% to 85% tungsten by weight of the composite, and the bronze consists essentially of 80% to 95% copper and balance tin by weight of the bronze.

10. An article comprising a composite as defined in claim 9.

11. An article comprising a composite as defined in claim 1.

12. A composite consisting essentially of liquid phase sintered tungsten particles in a copper/tin bronze matrix and an amount of iron, wherein said amount of iron increases the density of said composite relative to a composite in the absence of iron.

13. The composite of claim 12, wherein the tungsten is present in the composite in an amount of from 40% to 85% tungsten by weight of the composite.

14. The composite of claim 13, wherein the tungsten is present in the composite in an amount of from 50% to 55% tungsten by weight of the composite.

15. The composite of claim 12, wherein the bronze consists essentially of 80% of 95% copper by weight of the bronze, the balance being tin.

16. The composite of claim 15, wherein the bronze consists essentially of copper and tin in a ratio of about 9:1 by weight of the bronze.

17. The composite of claim 12, consisting essentially of 52% W, 47.2% pre-alloyed copper/tin bronze, and 0.8% Fe by weight of the composite, the bronze consisting essentially of copper and tin in a ratio of about 9:1 by weight of the bronze.

18. The composite of claim 12, wherein the tungsten has a mean particle size of from 0.5 to 50 μm and the bronze has a mean particle size of less than 100 μm.

19. The composite of claim 18, wherein the tungsten has a mean particle size of from 1 to 20 μm and the bronze has a mean particle size of less than 50 μm.

20. The composite of claim 12, wherein the composite consists essentially of from 40% to 85% tungsten by weight of the composite, and the bronze consists essentially of 80% to 95% copper and balance tin by weight of the bronze.

21. An article comprising a composite as defined in claim 12.

22. An article comprising a composite as defined in claim 20.

23. A composite consisting essentially of liquid phase sintered tungsten particles in a copper/tin bronze matrix, sintered at a temperature of at least about 600 C., the composite having no visible voids in its microstructure at 1000 times optical magnification, the composite having a strength under compression of at least about 155 MPa.

24. The composite of claim 23, wherein the tungsten is present in the composite in an amount of from 40% to 85% tungsten by weight of the composite.

25. The composite of claim 24, wherein the tungsten is present in the composite in an amount of from 50% to 55% tungsten by weight of the composite.

26. The composite of claim 23, wherein the bronze consists essentially of 80% to 95% copper and balance tin, by weight of the bronze.

27. The composite of claim 23, wherein the bronze consists essentially of copper and tin in a ratio of about 9:1 by weight of the bronze.

28. The composite of claim 23, wherein the composite consists essentially of from 40% to 85% tungsten by weight of the composite, and the bronze consists essentially of 80% to 95% copper and balance tin by weight of the bronze.

29. The composite of claim 23, wherein the composite consists essentially of 52% tungsten and 48% bronze by weight of the composite, the bronze consisting essentially of copper and tin in a ratio of about 9:1 by weight of the bronze.

30. The composite of claim 23, further including an amount of iron, wherein said amount of iron increases the density of said composite relative to a composite in the absence of iron.

31. The composite of claim 23, wherein the tungsten has a mean particle size of from 0.5 to 50 μm and the bronze has a mean particle size of less than 100 μm.

32. The composite of claim 31, wherein the tungsten has a mean particle size of from 1 to 20 μm and the bronze has a mean particle size of less than 50 μm.

33. The composite of claim 23, wherein the temperature is in the range from about 800–1100 C.

34. The composite of claim 33, wherein the strength under compression is at least about 460 MPa.

35. An article comprising a composite as defined in claim 23.

36. An article comprising a composite as defined in claim 28.

* * * * *